United States Patent [19]

Hnat

[11] Patent Number: 4,544,394
[45] Date of Patent: Oct. 1, 1985

[54] VORTEX PROCESS FOR MELTING GLASS

[76] Inventor: James G. Hnat, 3774 Lewis Rd., Collegeville, Pa. 19426

[21] Appl. No.: 585,979

[22] Filed: Mar. 5, 1984

[51] Int. Cl.$^4$ ................................................ C03B 5/14
[52] U.S. Cl. ........................................ 65/27; 65/135; 65/136; 65/335; 65/347
[58] Field of Search .................... 65/27, 134, 135, 335, 65/347, 136

[56] References Cited

U.S. PATENT DOCUMENTS

| | | | |
|---|---|---|---|
| 2,006,947 | 7/1935 | Ferguson | 49/53 |
| 2,634,555 | 4/1953 | Henry et al. | 49/77 |
| 3,077,094 | 2/1963 | Jack et al. | 65/136 |
| 3,172,648 | 3/1965 | Brichard | 263/31 |
| 3,185,554 | 5/1965 | Swed et al. | 65/17 |
| 3,244,494 | 4/1966 | Apple et al. | 65/136 |
| 3,443,921 | 5/1969 | Boivent | 65/335 X |
| 3,510,289 | 5/1970 | Boivent | 65/335 |
| 3,748,113 | 7/1973 | Ito | 65/135 X |
| 4,185,984 | 1/1980 | Kiyonaga | 65/135 |
| 4,381,934 | 5/1983 | Kunkle et al. | 65/135 |

FOREIGN PATENT DOCUMENTS 1020567  2/1966  United Kingdom .................. 65/134

Primary Examiner—Robert Lindsay
Attorney, Agent, or Firm—Steele, Gould & Fried

[57] ABSTRACT

A method of melting glass in a vortex reactor wherein first pulverized glass batch materials are entrained and preheated in a suspension preheater thereby creating a first gas-solids suspension. This first gas-solids suspension is thereafter mixed with a second gas-solids suspension comprised of additional glass batch material in a vortex reactor. The first gas-solids suspension and the second gas-solids suspension are introduced into the vortex reactor through at least one injector assembly. The stoichiometry and heat release in the vortex reactor are controlled by adjusting the oxidant/fuel ratio in the suspension preheater and the vortex reactor. The heated suspension particles are mixed and distributed to the walls of the vortex reactor by fluid mechanically induced centrifugal forces with glass forming reactions occurring along the vortex reactor walls. The formed glass is rapidly refined and homogenized along the vortex reactor walls in a thin layer under the influence of gas dynamic shear forces. The rapidly refined formed glass is collected in a reservoir for final refining and homogenization and distribution to glass manufacturing facilities.

20 Claims, 10 Drawing Figures

VORTEX PROCESS FOR MELTING GLASS

BACKGROUND OF THE INVENTION

This invention relates to the field of glass melting and in particular relates to the melting of pulverized glass batch concurrent with the combustion of a fuel in a high temperature vortex melting system.

In presently available gas or oil fired glass melting operations, the glass product is formed by melting mineral matter (glass batch) in an open-hearth type furnace. Many design changes have been incorporated into these furnaces since the original patents obtained by the Siemens family in the late 1800's. However, the fundamental heat transfer mechanisms for melting the glass batch are still quite similar to those in the original furnaces. Because open-hearth furnaces primarily rely on radiation from the flame and crown for heat transfer to the batch being melted, the surface area of the melter is necessarily large. This large surface area, even with substantial insulation, leads to wall heat transfer losses which are in the order of 20 per cent of the thermal input into the melter. Thses high wall heat transfer losses coupled with the heat losses associated with the stack gas and glass product sensible heat are the major factors contributing to the low operating efficiency of current furnace designs. Typical heat rates for current furnace designs range from 5.0 million Btu to 7.0 million Btu per ton of glass produced. The heat rate for the vortex melting systems of the present invention using conventional heat recovery technology is projected to be in the range of 2.9 million to 4.0 million Btu/ton without electric boosting. Projections are that heat rates as low as 2.5 million Btu/ton are possible if advanced heat recovery technology is utilized.

Numerous attempts have been made to improve furnace efficiency over the past 50 years. Descriptions of innovative glass melting concepts for which development has been attemped have been compiled by A. G. Pincus in *Melting In the Glass Industry*—6 volumes, Books for Industry, New York 1976. Of particular note is the furnace invented by Alexander Ferguson in 1923 which is reported to have melted 60 mesh glass batch in suspension in a refactory lined cyclone type furnace.

In addition, a number of plasma arc furnaces have also been developed which incorporate suspension melting. Several of these furnace designs are described in the "Journal of Minerals Science Engineering," Volume 9, No. 3, July, 1977. Plasma arc furnaces rely heaviy on the use of electric power for the melting process, and although different in principle from the gas or oil-fired vortex glass melting process, do demonstrate the ability to melt glass and ceramic type products in suspension.

SUMMARY OF THE INVENTION

The primary purpose of this invention is to melt glass and glass-like products in a thermally efficient manner in a high temperature gas or oil-fired vortex melting system. The process invention assumes the vortex melter incorporates the essential combustion stabilization and particulate separation features of slagging coal combustors such as the AVCO toroidal vortex combustor, the TRW horizontal cyclone combustor, the PETC vertical reverse flow cyclone combustor and the GE axial swirl cyclone combustor developed for the U.S. Department of Energy for magnetohydrodynamic (MHD) power generation applications, and/or conventional cyclone combustors such as those developed by Babcock & Wilcox for steam generation.

A second objective of the invention is to reduce the NOx and SOx flue gas emissions relative to those emissions typical for current gas or oil-fired open-hearth type glass furnaces.

A third objective is to provide operational flexibility in terms of improved startup and shutdown and product change-over capability.

A fourth objective is to reduce the furnace capital cost through the elimination or at least minimization of melter refractories.

The present vortex glass melting process relates to the melting of pulverized glass batch concurrent with the combustion of gas or oil or other fuels in a high temperature vortex melting system. A primary distinction between the use of the vortex chamber for glass melting applications versus its use for MHD power generation or steam generation relates to the embodiment of the device as a method of conserving fuel through the reduction of heat losses for glass melting as opposed to the combustion of coal or other fuel for the production of a high temperature MHD plasma or steam.

The present process incorporates efficient heat transfer to pulverized glass ingredients and low wall heat losses in a high temperature vortex type reactor while providing additional process capabilities which cannot be achieved in current commercial glass melting systems. Specifically, the use of the vortex melter provides for the potential control of NOx formation via staged combustion and combustion product time-temperature control; the vortex melter eliminates the use of expensive refractory bricks in the glass melting zone; and the vortex melter allows for rapid startup and shutdown and product change-over due to reduced use of refractories and reduced glass inventory within the melter. The production of reduced flint glass without the use of salt cake also appears feasible.

In one embodiment of the process of the present invention, glass forming materials are melted in a vortex reactor by preheating first glass batch material or materials in an entrained flow gas or oil-fired suspension preheater. This entrained gas-solids suspension is then mixed with a second glass forming material or materials along with oxidant and/or fuel in an injector nozzle assembly thereby producing a second gas-solids suspension. The second gas-solids suspension is introduced into the reaction chambr of a vortex reactor in such a manner as to produce a vortex flow. The vortex flow within the reaction chamber provides for flame stabilization for a second stage of combustion, provides additional suspension heating of the glass batch materials and disperses the preheated particulates to the walls of the reactor by fluid mechanically induced centrifugal forces. The interdispersed preheated glass materials which are dispersed to the reactor chamber walls coalesce and react to form a molten liquid glass layer on the reacter chamber walls. The motion of the liquid glass layer within the vortex reactor, under the influence of gas dynamic shear forces and gravity, rapidly refines and homogenizes the liquid formed glass. The rapidly refined and homogenized glass then passes to a reservoir under the influence of these forces where final refining and homogenization occurs.

BRIEF DESCRIPTION OF FIGURES

Additional objectives and a more complete understanding of the invention will become apparent from the following detailed description taken in conjunction with the formal drawings, wherein.

DETAILED DESCRIPTION OF THE INVENTION

Figure 1:
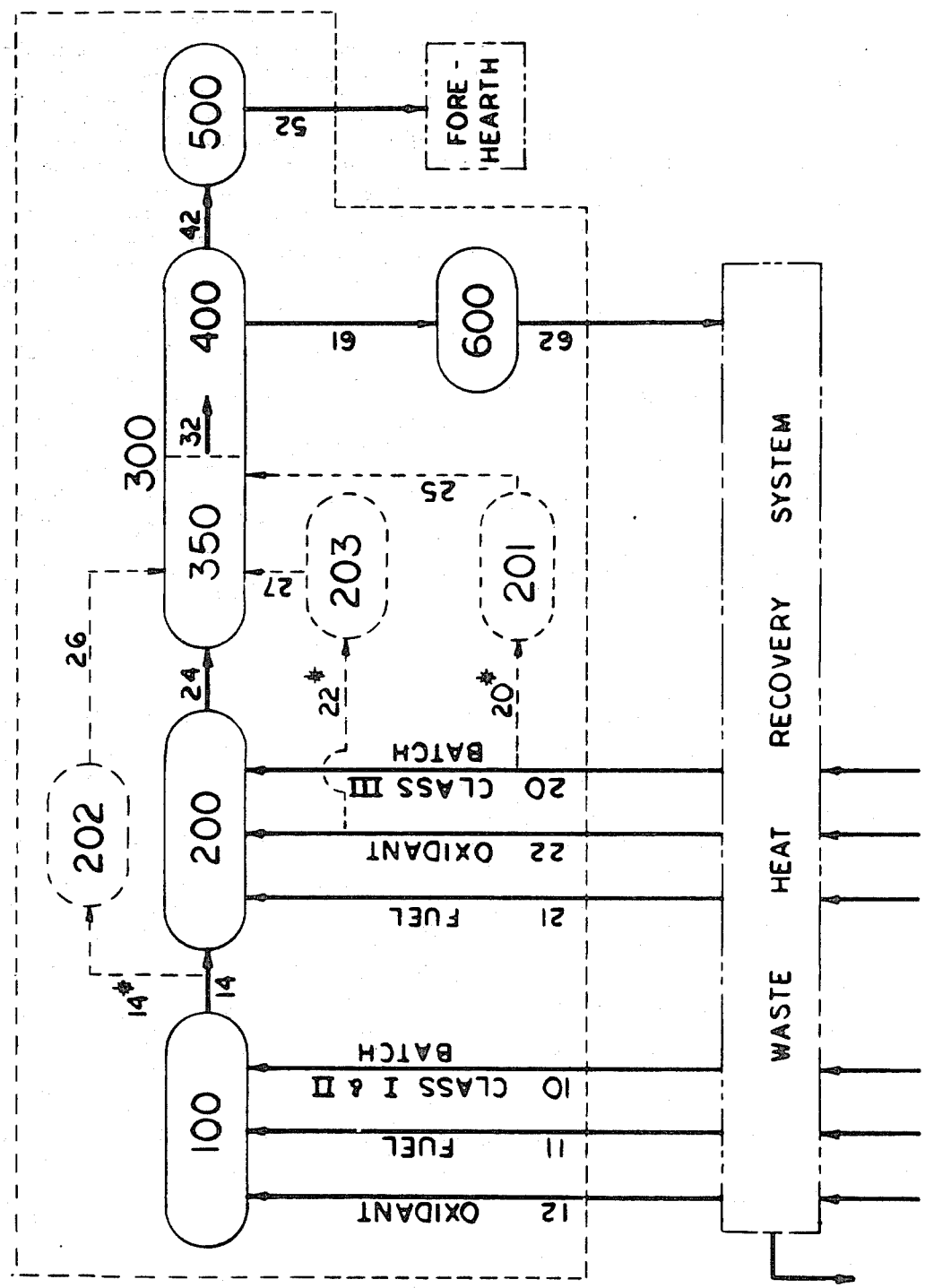
FIG. 1 is a process diagram depicting the primary process steps of the vortex melting process.

To practice the method of this invention, pulverized glassmaking materials and sequentially and segmentally preheated in a suspension preheater and injector assemblies (such as nozzle or swirlvane injectors) and subsequently introduced into a vortex reactor, whereby additional combustion, particle heating and particle mixing occurs, with the batch ingredients being separated by fluid mechanical centrifugal separation forces to the reactor vessel walls, where the preheated particulates coalesce and glass forming reactions occur. Homogenization and refining take place as the formed glass moves along the walls of the reaction vessel in a thin layer under the influence of gas dynamic shear forces and gravity.

The process invention sequentially and segmentally preheats three classes of glass batch ingredients. Class I batch ingredients are defined as glassmaking materials which do not decompose readiy upon heating, and the oxides of these materials have relatively low vapor pressures (i.e., less than about 0.1% of the species in the vapor phase) at temperatures typically for glassmaking operations; i.e., 2100° F.–3000° F. Examples of Class I batch ingredients are sand, cullet, syenite, and burned lime. Class II batch ingredients are defined as glassmaking materials which decompose or offgas readily upon heating, but the oxides of these materials have relatively low vapor pressures at glass melting temperatures. Examples of Class II batch materials are limestone ($CaCO_3$) and dolomite ($CaO.MgO.2CO_2$). For these Class II ingredients, $CO_2$ is driven off upon heating to temperatures above about 1800° F. The remaining oxides, CaO and MgO, however have low vaor pressure and remain stable at temperatures to well above 4000° F. Class III batch materials are ingredients which decompose readily upon heating, and the remaining oxides have relatively high vapor pressures (i.e., greater than about 1% of the species in the vapor phase) at glass melting temperatures. Examples of Class III glass batch ingredients are soda ash ($Na_2CO_3$) and potassium carbonate ($K_2CO_3$). For Class III materials, temperature elevation drives off the $CO_2$ and can also substantially vaporize the remaining alkali oxide. The relatively low melting points of some Class III ingredients can limit the extent of preheating of these materials prior to introduction into the vortex reactor since plugging of the nozzle or swirlvane injector assemblies can occur at temperatures in excess of about 1500° F. In this regard, the melting points of $Na_2CO_3$ and $K_2CO_3$ are 1562° F. and 1635° F., respectively.

The process is designed to efficiently utilize liquid or gaseous fuels, with gaseous fuels including low Btu, medium Btu, high Btu, and reformed gases. The liquid fuels can include oil, methanol, ethanol and other liquid hydrocarbon fuels.

In this process invention, the glass batch ingredients are sequentially and segmentally preheated to provide temperature control of the batch materials during preheating in order to minimize alkali oxide vapor loss and to minimize plugging problems during preheating. Staged combustion is utilized to limit $NO_x$ formation. A controlled reducing environment can be provided in the vortex reactor for the production of preferably reduced flint glass with minimal use of sulfer-based refining agents.

The basic process steps of the invention are embodied in the process diagram depicted in FIG. 1 and are given physical perspective in FIGS. 2–10. The basic process steps are:

preheating of pulverized Class I and Class II batch ingredients 10 in a suspension preheater 100 to produce a first preheated gas-solids suspension 14;

introducing Class III batch ingredients 20 into a injector assembly 200 such as a nozzle or swirlvane injector;

introducing the first gas-solids suspension 14 into the injector assembly 200 and mixing the first gas-solids suspension 14 with the second batch ingredient 20 in the injector assembly 200 to produce a second gas-solids suspension 24;

providing a vortex reactor 300 where a second stage of fuel/oxidant reaction occurs, the glass making materials being preheated and interdispersed in suspension and subsequently separated to the reactor walls from the gas stream by fluid mechanical centrifugal forces in a primary separation/reaction section 350 of the vortex reactor 300;

forming melted glass 32 in a thin layer along the reactor walls by the coalesence and reaction of the preheated batch materials;

producing a rapidly homogenized and refined glass 42 in a rapid refining section 400 of the vortex reactor 300 by mixing the glass layer along the reactor walls under the influence of gas dynamic shear forces;

collecting the hot product glass 51 in a distributor reservoir 500 wherein final homogenization and refining take place; and removing the hot flue gas 62 through an exhaust duct 600 and preferably directing the hot gas to a waste heat recovery system.

The interface boundary A shown in FIG. 1 identifies the major process steps. Various means may be provided for: recovering waste heat from the flue gas 62; delivering preferably preheated Class I and Class II batch ingredients 10 to the suspension preheater 100; delivering preferably preheated fuel 11 to the suspension preheater 100; delivering preferably preheated oxidant 12 to the suspension preheater 100; delivering preferably preheated Class III batch ingredients 20 to the injector assembly 200 or 201; delivering preferably preheated fuel 21 to the injector assembly 200; delivering preferably preheated oxidant 22 to an injector assembly 200 or 203; delivering the flue gas 62 exiting the vortex reactor to a waste heat recovery system; delivering the hot product glass 52 exiting the reservoir 500 to forehearths; delivering cooling water (not shown) to the system; and delivering the heated cooling water (not shown) to process or heat recovery facilities.

The suspension heater 100 is provided primarily to preheat the Class I and Class II batch ingredients 10 in suspension without the initiation of glass forming reactions. This is accomplished by either mixing the batch ingredients 10 with preheated oxidant 12 or by mixing the batch ingredients 10 with the combustion products resulting from the reaction of fuel 11 in a suspension type preheater 100, or by both methods. The suspension preheater 100 can include recirculation zones for flame stabilization and enhanced heat transfer; however, separation of the glass ingredient particulates from the gas stream is not a necessary purpose of this preheating step. The temperature of the batch ingredients 10 entering the suspension preheater 100 is typically on the order of 70° F.–1200° F., depending on the extent of preliminary batch preheating. Preliminary suspension preheating included as part of the waste heat recovery system shown in FIG. 1 will enhance the efficiency of the glass melting process; however, it is not essential. The temperature of the preheated oxidant 12 delivered to the suspension preheater 100 is typically in the range of 500° F. to 2300° F., depending to some extent on the type of heat recovery utilized and the level of oxygen enrichment. With high levels of oxygen enrichment, materials limitations and safety considerations will generally limit the oxidant preheat temperature to 1200° F. or less. The size distribution of the Class I and Class II batch ingredients 10 delivered to the suspension preheater 100 are in the range of 50 percent–60 mesh to 90 percent–400 mesh, which is finer than the $-40+140$ mesh batch ingredients which are typically used in glass melting operations in conventional open hearth furnaces. The average temperature of the gas-solids suspension 14 exiting the suspension preheater is approximately 500° F. to 3000° F., depending on the oxidant used, the level of preliminary batch preheating; the solids loading; and whether or not fuel combustion is used in the preheating step. With fuel combustion, stoichiometries in the range of 60 percent to 110 percent are typical with substoichiometric opertion being preferred as a means of limiting $NO_x$ formation. The fuel 11 for the suspension preheater is preferably preheated gas or oil; the oxidant 12 is preferably air, oxygen-enriched air or pure oxygen.

The Class III batch ingredients 20 such as soda ash ($Na_2CO_3$) and potassium carbonate ($K_2CO_3$) are introduced into an injector assembly or assemblies 200 for distribution into the vortex reactor 300. The Class III ingredients are mixed with the preheated gas-solids suspension 14 in the injector assembly; however, the primary heating for these species occurs within the reactor. The objective of staging or segmenting the species injection is to limit and control the time-temperature history of the Class III batch ingredients so as to minimize alkali oxide vapor phase losses to the combustion products. The injector assembly 200 which can be, for example, a nozzle or swirlvane injector, can include provisions for introducing additional oxidant 22 and fuel 21 as a means of providing supplementary heat release for augmented batch preheating and controlling the stoichiometry and temperature within the vortex reaction chamber. The temperature of the Class III batch ingredients 20 delivered to the injector assembly is typically in the range of 70° F.–1500° F. The oxidant 22 delivered to the injector assembly can be air, oxygen-enriched air or pure oxygen. Preheat temperatures typically are in the range of 500° F. to 2300° F. depending on the type of heating utilized and the level of oxygen enrichment. A separate injector 203 is an alternative means of introducing the oxidant into the reactor. The fuel 21 delivered to the injector assembly is preferably gas, oil, reformed gas or any other gaseous or liquid hydrocarbon fuel. The size distribution of the Class III ingredients is typically in the range of 50 percent–60 mesh to 90 percent–400 mesh. Selection of the size distribution provides a means of controlling the time-temperature history of the batch ingredients within the vortex reactor.

All of the total batch ingredients are heated in suspension within the vortex reactor by the combined effects of convective, radiative and particle-particle heat transfer. The ingredients introduced are separated from the gas stream within the reactor by fluid mechanically induced centrifugal forces produced by the confined vortex 30 and distributed to the inside walls 355 of the reactor 300 where coalescense of the batch ingredients and initial glass forming reactions occur. By proper control of combustion tempertures, particle size distributions and heat release rate, the particulates collecting on the vortex reactor walls will be close to the glass melting temperature which is typically in the range of 2100° F.–3000° F., depending on the type of glass being produced. Entrance velocities of the oxidants, fuel and gas-solids suspension entering the reactor coupled with the geometry and orientation of the injector assemblies and the geometry of the vortex reactor, determine the particulate separation performance of the reacter. Injection velocities typically range from 30 m/s to 350 m/s and the process drops across the vortex milting system range from 0.1 psi to 5 psi, depending primarily on the level of particulate separation efficiency. Pressurized operation of the melter (up to 8 atm) is possible; however, atmospheric operation is more compatible with conventional glass melting operations. The preferably water-cooled walls 355 of the reactor are of a "wetting" type design to ensure that bare "hot sports" do not occur. Metal wall construction similar to that developed for MHD slagging combustors has been found to be an effective wall construction design.

The initial glass 32 formed along the reactor walls 355 moves along the walls under the influence of gas dynamic shear forces and gravity. The motion of the thin glass layer under the influence of these forces rapidly refines and homogenizes the glass to form a rapidly refined molten glass 42. The rapid homogenization and refining occurs in a section 400 of the reactor which is simply an extension of the primary vortex separation and glass forming section 350 of the reactor 300. The rapidly refined and homogenized glass 42 enters a reservoir 500 for final refining and homogenization. The final refined and homogenized glass 52 exits the reservoir 500 and passes to forehearths or other devices for final glass manufacturing. Flue gas 62 exits the reactor through a preferably water-cooled exhaust duct 600. The preferred location and geometry of the exhaust duct is dependent on the type of reactor being utilized for the melting process. The hot flue gas 62 is preferably directed to a waste heat recovery system. The flue gas temperatures are typically in the range of 2300° F.–3300° F., depending primarily on the type of glass being produced.

Toroidal Vortex Melting

Figure 2:
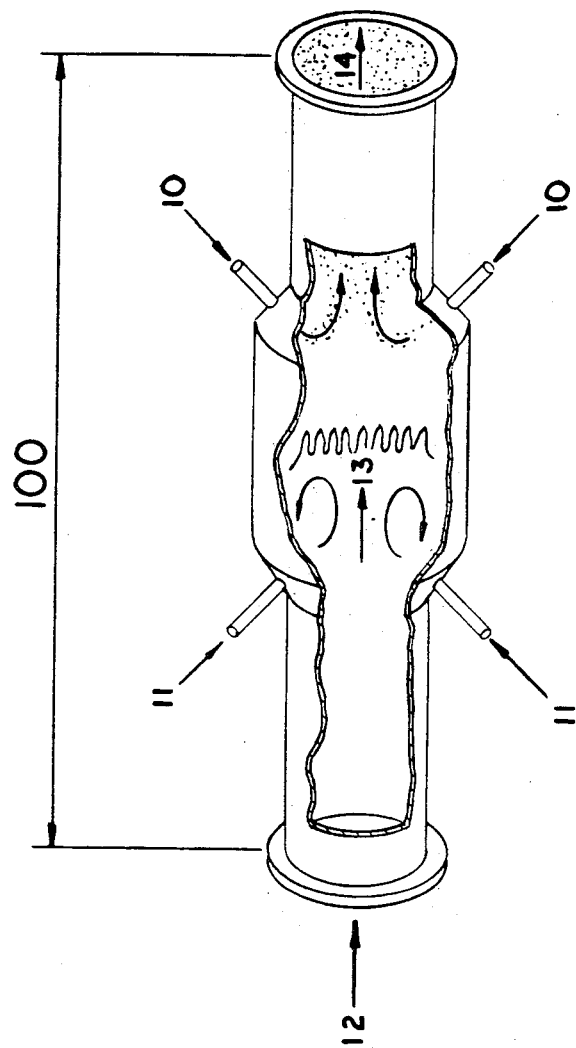
FIG. 2 is an isometric sketch of a suspension preheater assembly with a circular exit area.
Figure 4:
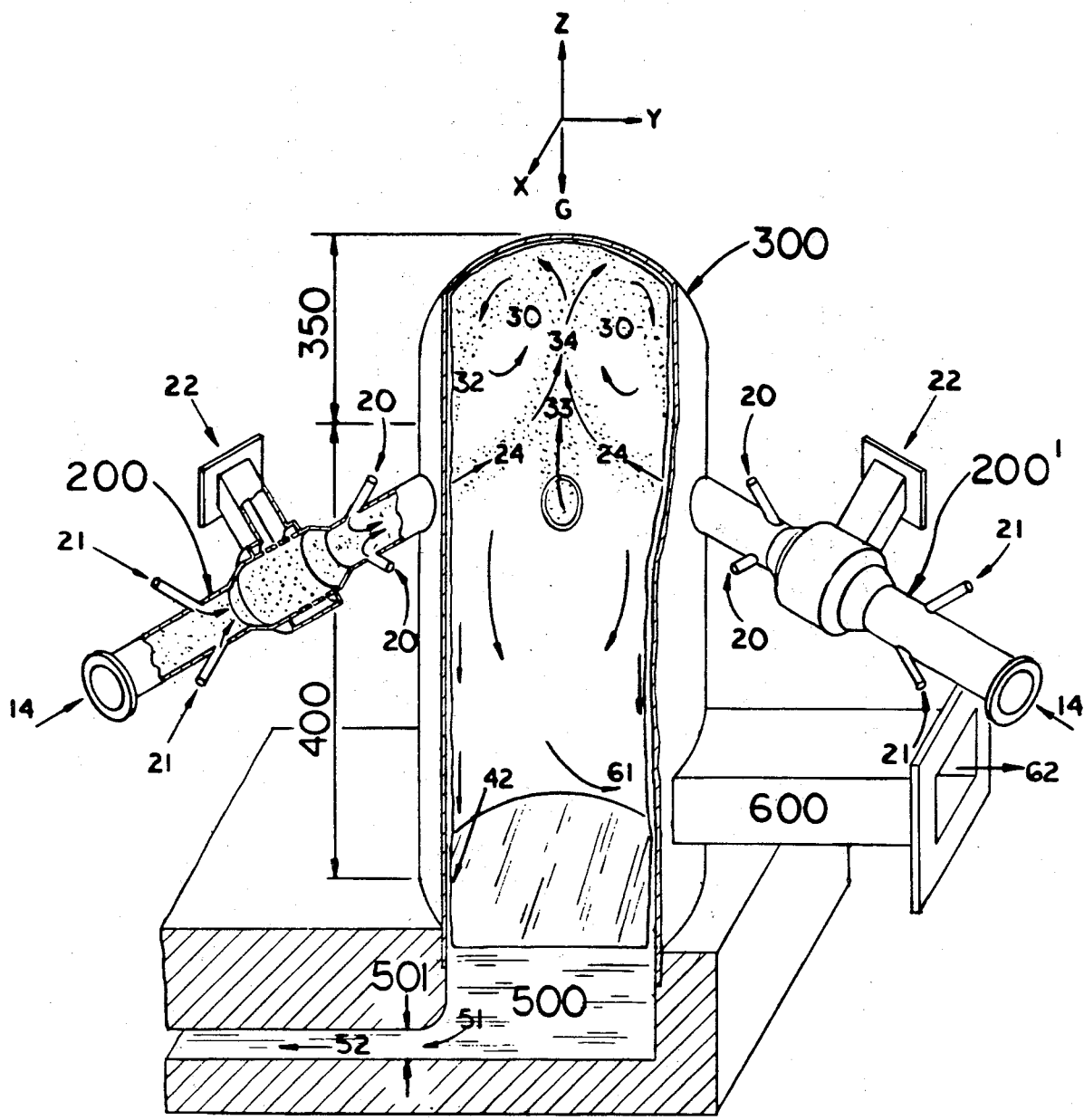
FIG. 4 is an isometric sketch of a toroidal vortex reactor as applied to the vortex melting process.

A preferred embodiment of the vortex melting process of this invention is the application to a toroidal vortex system as shown in FIGS. 2 and 4. In FIG. 4, the force of gravity is in the negative Z direction and the Z axis is the axis of rotation of the vortex reactor vessel. In this glass melting process the batch ingredients are separately preheated and staged combustion of the fuel is used as a means for controlling $NO_x$ formation as well as the time-temperature history of the batch ingredient particulates. Preheating of the Class I and II batch ingredients 10 occurs in a suspension preheater 100 by mixing the batch ingredients with the combustion products 13 formed from the reaction of preferably preheated fuel 11 and preferably preheated oxidant 12. The stoichiometry of combustion ranges from 60 percent to 110 percent, with substoichiometric (fuel rich) combustion being preferred as a means for controlling $NO_x$ formation. Class II batch ingredients may be injected along with the Class I batch ingredients since flame quenching in the combustor is mitigated by injecting the batch ingredients downstream of the flame zone F. The combustion products 13 formed from the combustion of the fuel are generally in the range of 2700° F. to 5000° F. depending on the type of fuel used, oxidant used, level of preheating and combustion stoichiometry. If fuel is used in the preheating step, the average temperature of the gas-solids suspension 14 leaving the preheater 100 will generrlly be in the range of 1000° F. to 3000° F. depending preliminary on the solids-to-gas-loading ratio, the stoichiometry of combustion and level of oxidant preheat. If fuel 11 is not used in the suspension preheater, the resuting gas-solids mixture 14 will have an average temperature in the range of 600° F. to 1600° F. depending primarily on the level of oxidant preheat and the solids-to-gas loading. Thegas-solids suspension 14 exiting the suspension preheater is mixed with Class III batch ingredients 20 in a nozzle assembly 200 to form a mixture of Class I, II and III batch ingredients 24 which is injected into the vortex reactor 300. The nozle assembly is designed to receive an additional oxidant injection 22 and fuel injection 21 in order to control the combustion stoichiometry within the vortex reacter. Partial reaction of the fuel constituents of gas-solids stream 14 (if fuel rich) with oxidant stream 22 or the reaction of the oxidants in stream 14 (if oxidant rich) with the fuel stream 21 may occur in the nozzle assembly 200; however, the primary second stage combustion occurs in the vortex reactor 300, wherein the toroidal vortex 30 provides flame stabilization. The final stoichiometry in the vortex reactor will be typically in the range of 90 percent to 110 percent, with slightly reducing conditions preferred as a means of producing reduced flint glass in conjunction with constraining the level of $NO_x$ emissions.

The dispersed and preheated glass making ingredients 24 leaving the nozzle assembly are introduced into the vortex reactor 300 through a plurality of nozzle assemblies, 200, 200' 200'' attached to the vortex chamber wall. There are preferably three nozzle assemblies each nozzle assembly being an injector attached to an individual preheater assembly 100 and the reactor. The exit area of each nozzle defines the velocity of the jet of the preheated ingredients 24 entering the vortex primary separation section 350 of the reactor. Typical injection velocities range from 30 m/sec to 350 m/sec. The nozzle assemblies are oriented to provide an inclination of 35°–55° with the horizontal and are directed towards a common focal point 33 along the center line of the chamber and are approximately one diameter below the chamber dome. An inclination angle of 45° for the nozzle assemblies is nearby the optimum for vortex separation performance within the primary vortex section 350. The injector nozzles 200, 200', 200'' are spaced at 120° around the circumference of the primary vortex section 350 of the reactor.

Within the primary vortex separation and glass forming section 350 combustion reactions occur and heat is transferred to the batch ingredients via wall radiation, convective heat transfer from the combustion products, and particle-particle heat transfer which includes both radiation and impact effects. At the impingement point 33, the gas and glass ingredient jets impact and turn vertically upwards to form a central core 34 of a toroidal vortex 30 which encompasses the dome area and forms the primary vortex separation section 350. The toroidal motion of gas and particles within the dome area results in the centrifugal separation and dispersion of the glass ingredient particles toward the inside walls 355 of the reactor where the molten and/or hot glass ingredient particles interact to form a molten glass layer 32 via reactions with the other batch ingredients.

The melt layer 32 is formed by the distribution and coalescence of the hot and molten particulates along the wall zone of the primary vortex section. The distribution of particulates within the dome area is essentially homogeneous and leads to circumferential uniformity in the melt layer.

During the suspension heat up of the batch materials, the partial liberation of $CO_2$ and $H_2O$ reduces the refining requirements of the glass formed along the reactor walls.

The glass melting reactions occur at temperatures typically in the range of 2100° F.–3000° F. The melting reactions in the melt layer are supported by heat transfer to the walls by radiation, convection and particulate heat transfer. The preferably metal reactor walls are designed to be wetted by the molten glass 32 to ensure that bare spots do not form along the chamber walls. The grooved design shown in FIG. 10, which includes refractory wetting strips 359, is known to be an effective wall design. The glass layer formed along the inside walls 355 of the reactor is typically on the order of 1 cm thick or less as shown at B in FIG. 10. The inside walls 355 are preferably constructed of mild steel or alloy and are water-cooled 356. The glass layer 32a next to the water-cooled walls 355 is solidified and provides thermal insulation as well as corrosion protection. The glass layer 32b on the gas side, however, is inviscid and flows freely down the side of the reactor under the influence of gravity and gas dynamic forces 37.

Refining basically pertains to the elimination of $CO_2$ and $H_2O$ bubbles which form in the glass melt during the glass forming reactions. During the suspension heat up of the batch materials, the liberation of $H_2O$ and $CO_2$ reduces the refining requirements of the glass formed along the vortex chamber walls. The state of oxidation in the glass is an important factor in controlling the rate of refining, with somewhat reducing conditions being preferred. In conventional melting practice, salt cake is often used as a refining agent which involves the liberation of $SO_2$ gas, a flue gas pollutant. In this invention, the state of oxidation in the reactor can be accurately controlled to be slightly reducing, thus enhancing the refining potential for reduced flint glass production.

The liberation of $CO_2$ and $H_2O$ in suspension and the motion of the thin glass layer under gas dynamic and gravity forces enhances the refining process and provides a high degree of chemical and thermal homogeniety The refining section 400 of the reactor chamber is essentially a physical extension of the primary vortex section 350. The length of the refining section 400 impacts the glass residence time as well as temperature and can be used as a means of controlling the refining and homogenization process. The rapid refining process makes it possible to minimize the size of the refining section 400 and helps to reduce the amount of the salt cake required for reduced flint glass production.

After passing down the length of the refining section 400, the rapidly refined and homogenized glass flow 42 passes into a reservoir 500 located at the bottom of the reactor where final refining and homogenization occurs. The size of the reservoir can be adjusted to provide variations in residence time for the final refining process. A stirrer (not shown) can be utilized in the reservoir if additional homogenization is required. Typical glass temperatures in the reservoir are in the range of 2000° F.–2800° F.

Hot glass 52 exits the reservoir through a throat 501 and is distributed to forehearths (not shown) or other equipment for final processing. Flue gas 62 exits the reactor through a preferably water-cooled exhaust duct 600 located above the reservoir 500. Typical flue gas temperatures are in the range of 2300° F.–3000° F., depending to a large extent on the melt temperture of the glass being produced. Preferably, arrangements are made for delivering the existing flue gas 62 to a waste heat recovery system (not shown).

Cyclone-Type Vortex Reactors

Figure 3:
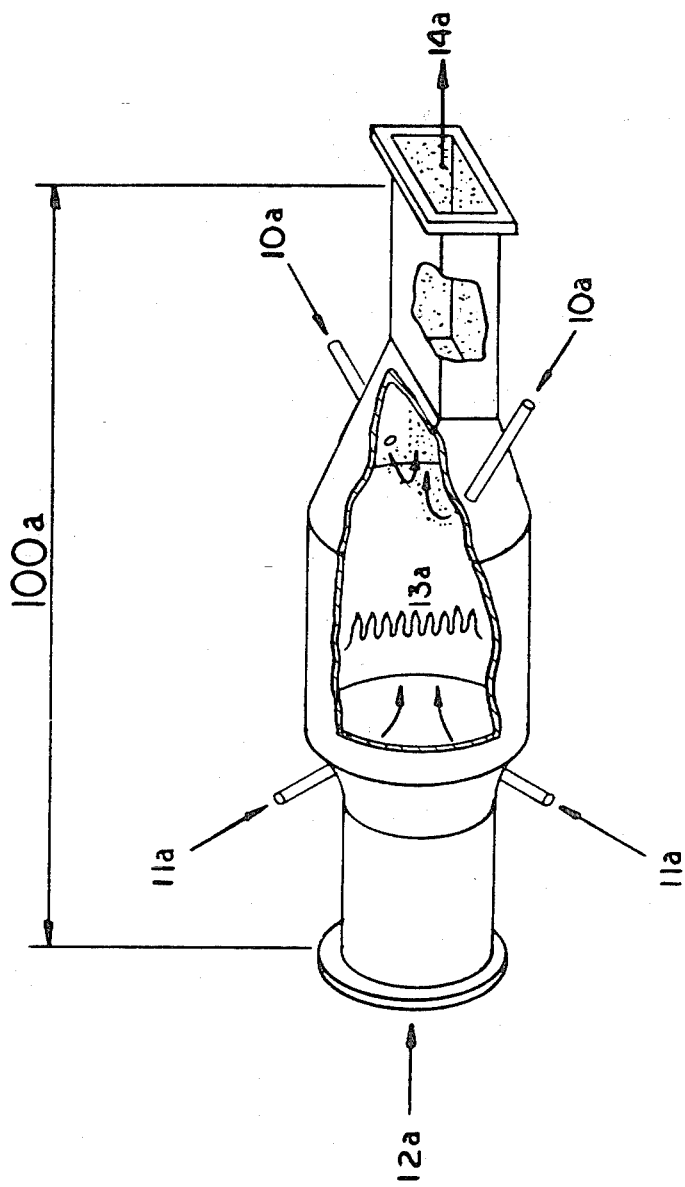
FIG. 3 is an isometric sketch of a suspension preheater with a rectangular exit area.
Figure 5:
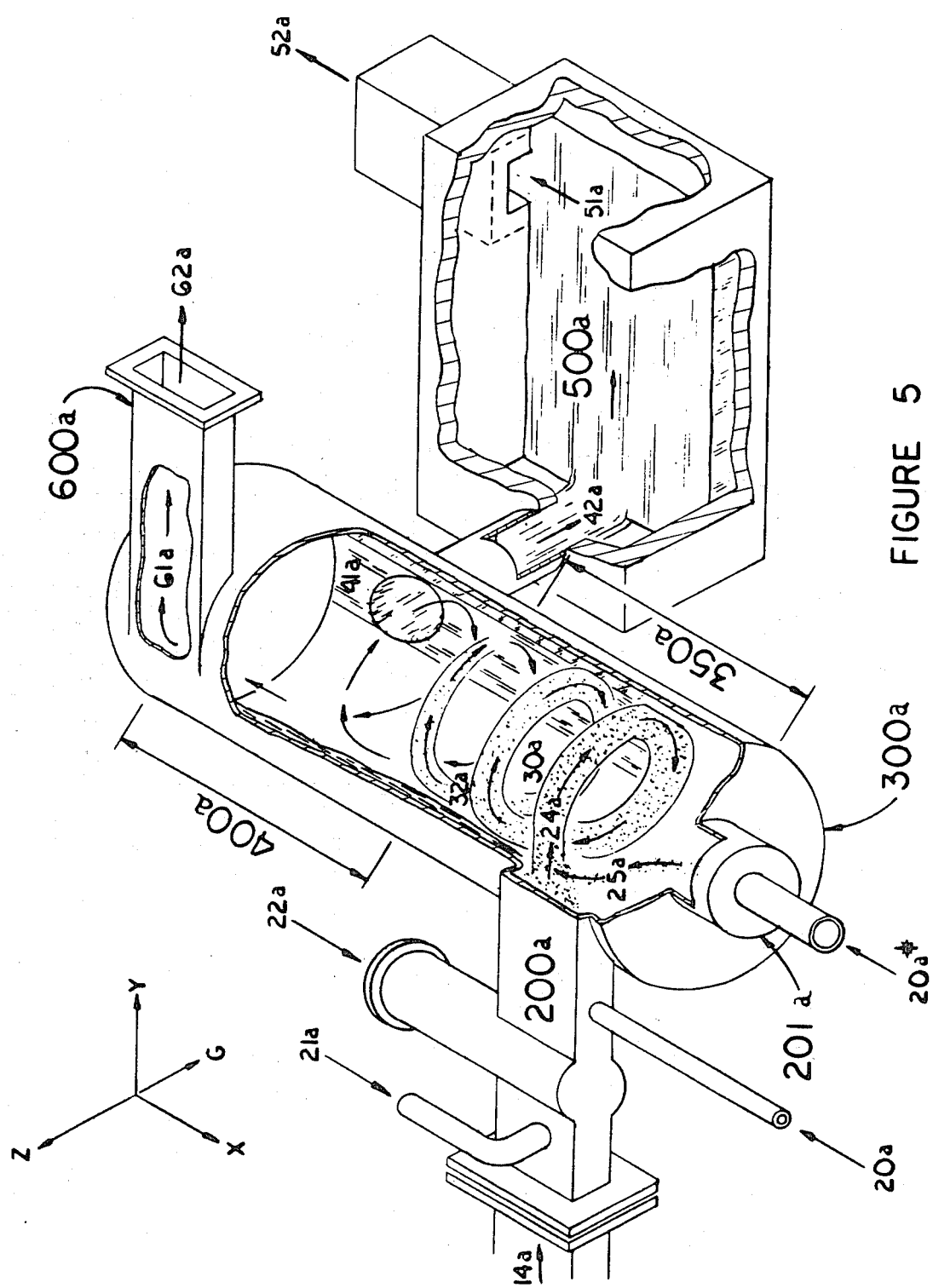
FIG. 5 is an isometric sketch of a horizontal, tangentially driven cyclone-type reactor as applied to the vortex melting process.

An alternate embodiment of the vortex melting process is the incorporation into a horizontal tangentially fired cyclone melting system as shown in FIGS. 3 and 5. In FIG. 5 gravity is shown in the negative Z direction. The primary process steps in this system are: the preheating of Class I and Class II glass batch materials 10a in a suspension preheater 100a; the introduction and/or preheating of Class III batch ingredients 20a, 20a* into injector assemblies 200a, 201a; the introduction of the resulting gas solid suspensions 24a and 25a into the cyclone vortex reactor 300a via injector assemblies 200a, 201a; the suspension preheating, mixing and dispersion of the preheated batch ingredients to the side walls of the vortex suspension reactor section 350a of a cyclone-type vortex reactor 300a; glass formation 32a along the reactor walls 355a by the coalescence, mixing and reaction of batch ingredients; the rapid homogenization and refining of the formed glass in a thin molten glass layer under the influence of gas dynamic shear forces and gravity within a reactor homogenization and refining section 400a; a final refining and homogenization of the glass in a reservoir 500a; and distribution of the flue gas via an exhaust gas duct 600a to a waste heat recovery system (not shown). The process sequences are basically the same as those for the toroidal vortex reacter with the following configurational or operational variations.

In a tangentially fired cyclone vortex reactor, the primary fluid mechanical separation forces are produced by the tangential or secant injection 24a of the combustion products, fuel, oxidants and gas-solid suspension into a cyclone chamber along its circumferential periphery.

The tangentially fired cyclone allows the use of a single injector assembly 200a, as opposed to the plurality of injector assemblies which may be required with a toroidal vortex reactor. An optional location for the Class III ingredient injector 201a is at the reactor forward wall as shown in FIG. 5. The nature of the vortex is also substantially different. The cyclone produces a Rankine-type vortex 30a as opposed to the Hill-type vortex 30 produced in the toroidal reactor. A plurality of injector and preheater assemblies can be adapted to the cyclone configuration; however, design simplicity suggests the use of a single preheater and injector flow train. Typical injector assemblies are injector nozzles with slot or channel-type ducts (FIG. 3) positioned so that the injector jet 24a orientation is nearly tangent to the circular cross-section of the cyclone chamber. The use of a single injector nozzle produces an asymmetric circumferential flow field within the cyclone chamber. This flow field, however, is quickly smoothed out as the gas and particulates move down towards the rearward portion of the vortex reactor. The circumferential homogeniety of the glass formed along the walls of the cyclone reaction will not be as uniform as with the toroidal reactor due to the asymmetric flow field and the horizontal orientation of the cyclone reactor which results in an asymmetric gravitational force acting on the molten glass layer.

The asymmetric gravity force produces a molten glass puddle 41a along the bottom of the cyclone reactor. The increased thickness of the glass layer in the puddle 41a tends to reduce the effectiveness of the rapid refining and homogenization process within the cyclone reactor. The rapid homogenization and refining section 400a of the cyclone reactor is not as clearly defined as with the toroidal vortex reactor in as much as particle deposition tends to take place along the entire length of the reactor. A majority of the particle deposition, however, occurs in the primary separation zone 350a of the cyclone reactor. The length of the rapid refining and homogenization section 400a can be increased to provide additional homogenization and refining time at the expense of increased wall heat transfer losses and pressure drop across the reactor. This type of reator has demonstrated high levels of particle separation efficiency, and hence, may provide some system advantages in terms of reduced particulate carry-over into any heat recovery system that is used in conjunction with the reactor.

In the horizontal cyclone reactor configuration, a tap hole or drainage duct 405a is used to deliver the hot glass 42a to a reservoir 500a where final homogenization and refining occurs. A stirrer (not shown) can be used to improve the homogeniety of the hot glass within the said distributor/reservoir. The refined and homogenized hot product glass exits the reservoir through a throat 501a. From the reservoir, the product glass 52a moves to forehearths or other process apparatus. The flue gas exhaust duct 600a is preferably located above the glass puddle and can either be a tangential exit, as shown, a secant exit along the side wall, or an exhaust hole at the end wall 410a of the reactor. The combustion products 62a are preferably connected to a heat recovery system (not shown). The size and geometry of the final refining and homogenization reservoir can be adjusted to accommodate the variations in refining and homogenization requirements for different types of glass being produced.

Additional embodiments of the vortex melting process can be adapted to other configurations of tangentially fired cyclone-type vortex reactors. These other configurations include the vertical downflow cyclone reactor shown in FIG. 6 and the vertical reverse flow cyclone reactor shown in FIG. 7.

Figure 6:
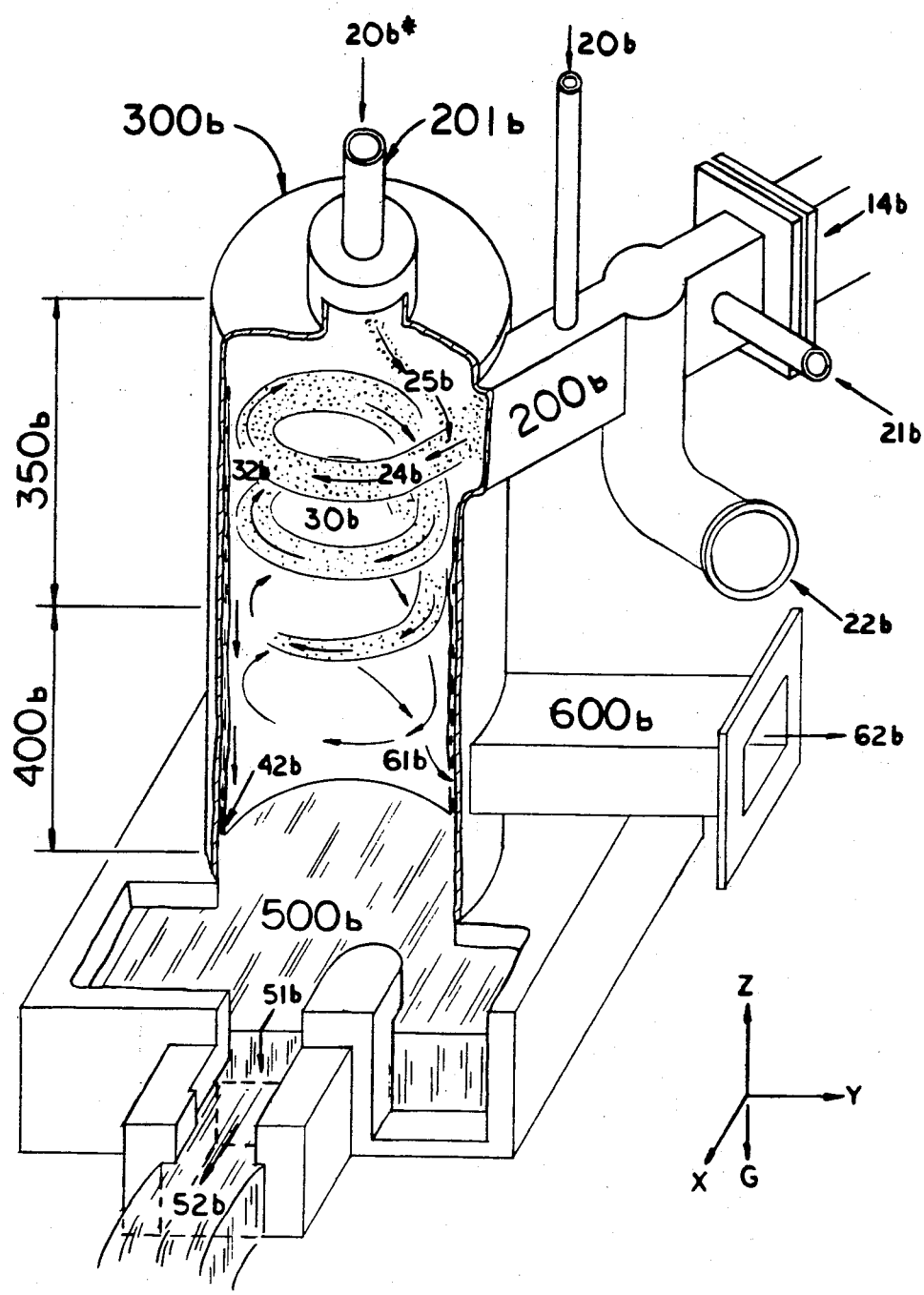
FIG. 6 is an isometric sketch of a vertical downflow, tangentially driven cyclone type reactor as applied to the vortex melting process.
Figure 7:
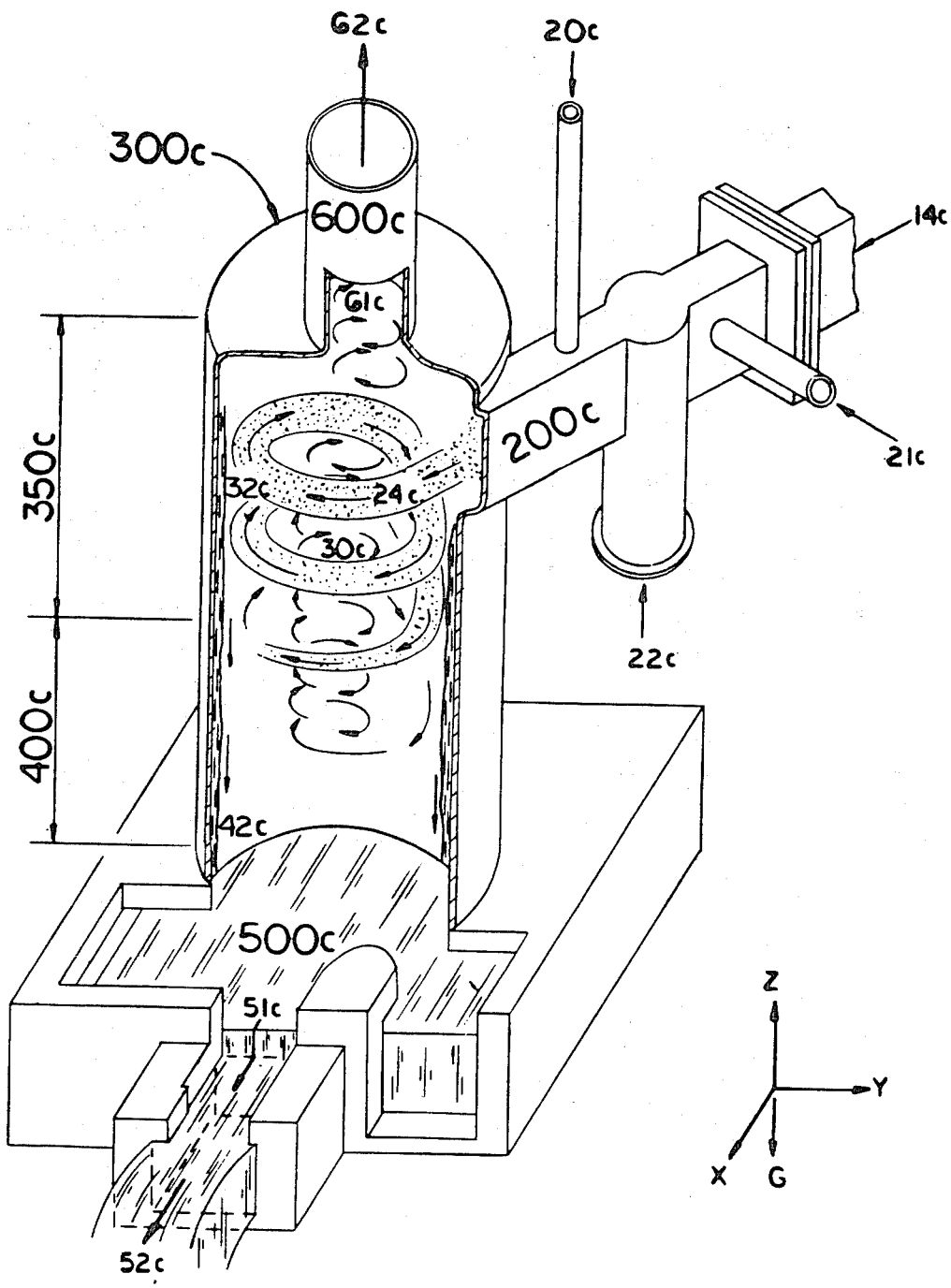
FIG. 7 is an isometric sketch of a vertical reverse flow, tangentially driven cyclone-type reactor as applied to the vortex melting process.

In the vertical cyclone orientations shown in FIGS. 6 and 7, the force of gravity on the molten glass layer is symmetrical with respect to the circumferential position within the reactor, thus providing a more uniform molten glass layer 32b, 32c along the sidewalls of the reactor and eliminating the puddle 41a which develops in horizontal cyclone reactors.

In a vertical downflow cyclone reactor shown in FIG. 6, the gaseous products (fuel, oxidant and combustion products) and batch ingredients 24b are introduced near the top of the reactor and both are withdrawn near the bottom of the reactor. In the vertical configuration, the final homogenization and refining reservoir 500b, is located at the bottom of the reactor 300b, and the flue gas distributor duct 600b is located above the reservoir, as in the case of the toroidal vortex reactor.

In the reverse flow vertical cyclone reactor shown in FIG. 7, the gaseous products and batch ingredients 24c are introduced near the top of the reactor and the molten glass 52c exits at the bottom 500c of the cyclone reactor similar to the previously described vertical downflow cyclone reactor. The gas flow, however, reverses direction near the bottom of the reactor in zone 400c and exits the reactor in a vortex core 61c through the exhaust duct 600c located at the top of the cyclone reactor chamber. As in the previous process concepts, it is preferred that the flue gas 62c be connected to a waste heat recovery system and that the hot product glass 52c be delivered to forehearths or other process apparatus.

Figure 8:
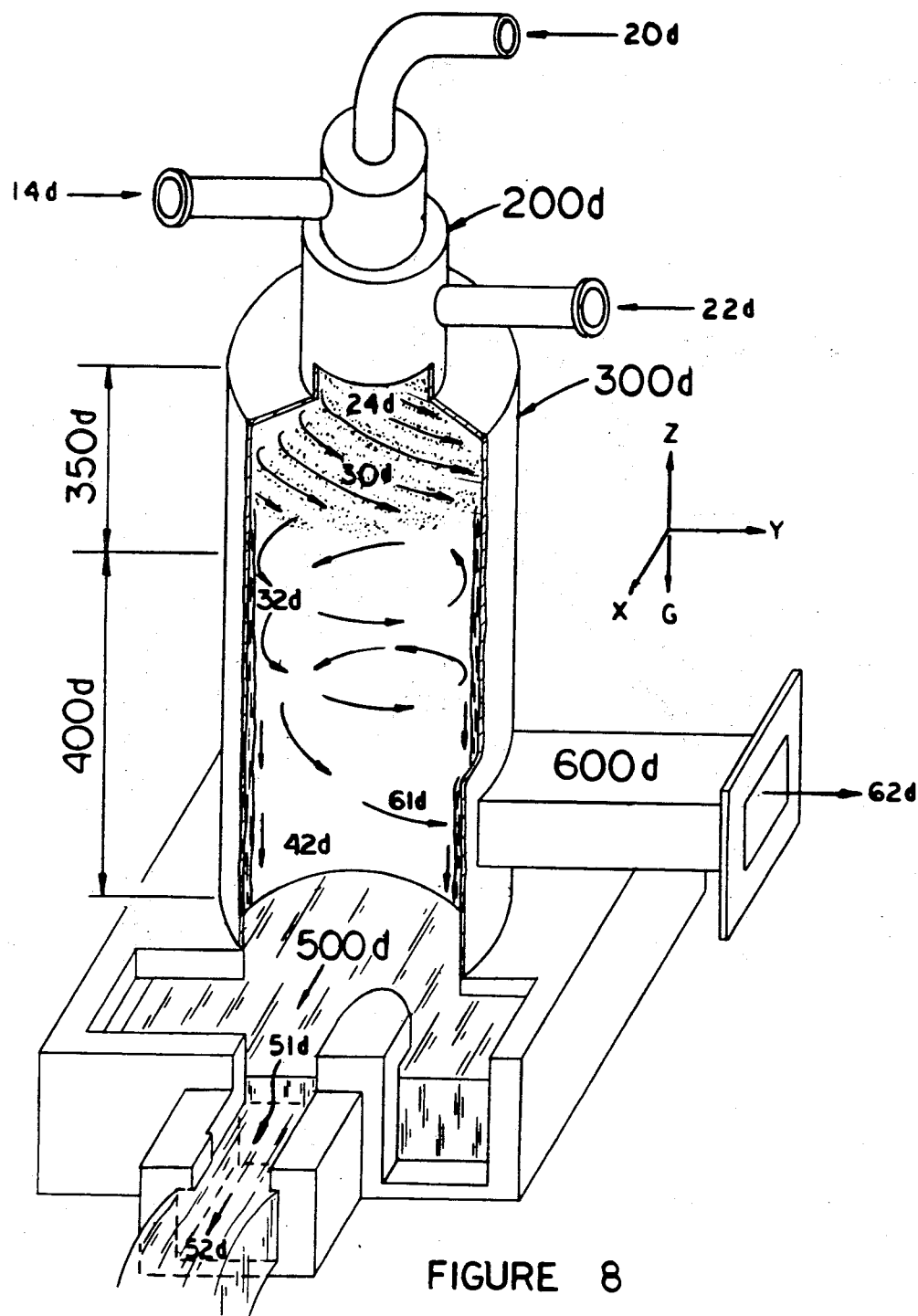
FIG. 8 is an isometric sketch of a vertical downflow, axial swirl cyclone type reactor as applied to the vortex melting process.

Still another embodiment of the vortex melting process is shown in FIG. 8 as it relates to a vertical downflow axial swirl cyclone-type vortex reactor. The primary process steps applied to this system are: the preheating of Class I and Class II batch materials in a suspension preheater 100a; the introduction of Class III batch ingredients 20d into an injector assembly 200d; the suspension preheating and mixing of the glass batch ingredients in the primary separation and reaction section 350d of the cyclone reactor 300d with glass formation 32d taking place along the side walls of the reactor vessel; rapid homogenization and refining of the formed glass in a molten glass layer under the influence of gas dynamic shear forces and gravity within a reactor homogenization and refining section 400d; final refining and homogenization of the molten glass in a reservoir 500d, and distribution of the flue gas via an exhaust duct 600d to a waste heat recovery system (not shown).

In an axial swirl cyclone reactor, the primary fluid mechanically induced centrifugal separation forces are produced by the injection of the fuel, oxidant, combustion products and gas-solids suspension into the cyclone reactor by a swirlvane injector assembly 200d located at the top wall of the reactor 300d. The swirlvane assembly 200d can be segmented to permit the separate injection of Class I, II and III batch ingredients into the reactor. The Class I and II batch ingredients are preheated in a suspension preheater 100a as previously discussed. The preheated gas-solids suspension 14d is then either mixed with the Class III batch ingredients in a common swirlvane assembly or injected separately into the cyclone reactor and mixed therein. The embodiment in FIG. 8 shows mixing of the preheated Class I and II suspension 14d and the Class III batch 20d in the injector assembly 200d prior to injection of the mixed gas-solid suspension 24d. Provisions for oxidant 22d and fuel injection 21d can be included in the swirlvane assembly design to allow for additional heat release and stoichiometry control within the reactor as previously discussed.

Figure 9:
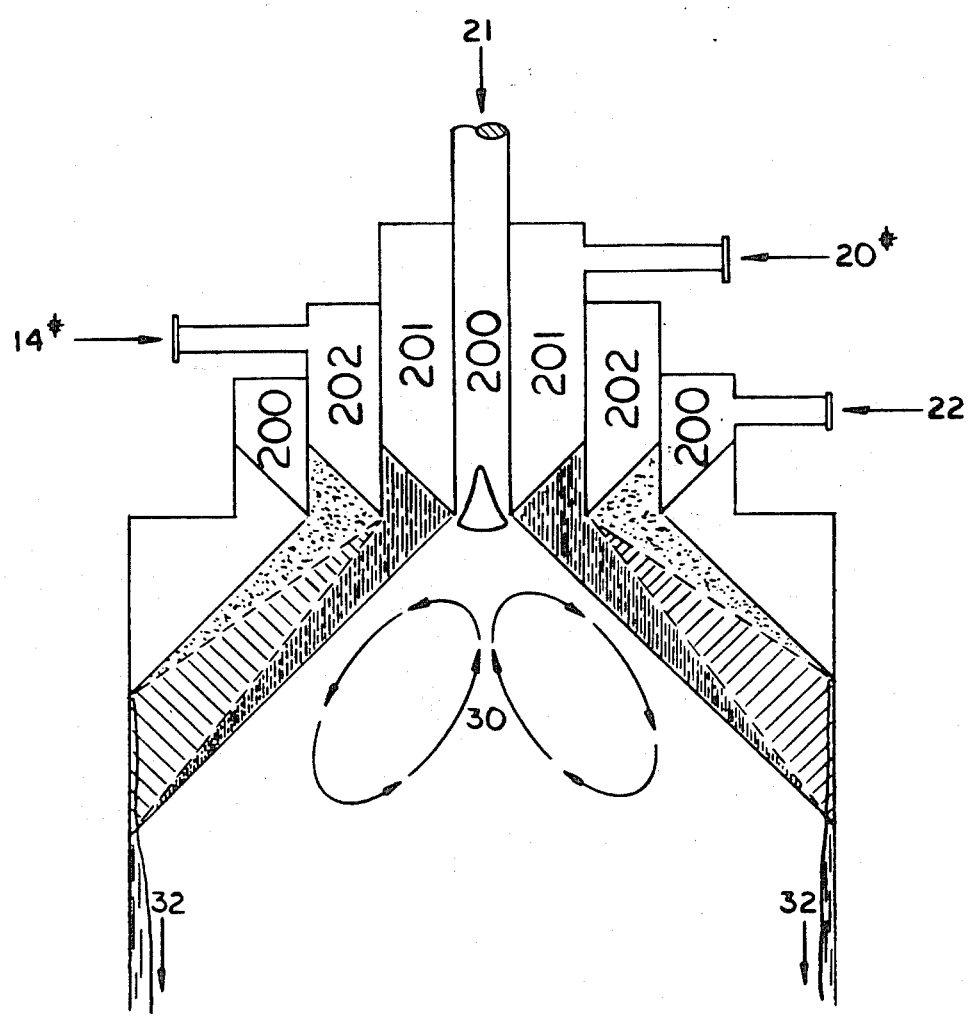
FIG. 9 is a cross-sectional sketch of a swirlvane injector assembly with separate swirlvane injectors for the introduction of fuel, oxidant, class I/II (together) and class III batch ingredients into a vortex glass melting reactor; and, FIG. 10 is a sketch of the wall zone of a vortex reactor showing the motion of the glass layer under the influence of active water cooling and gas dynamic shear forces.
Figure 10:
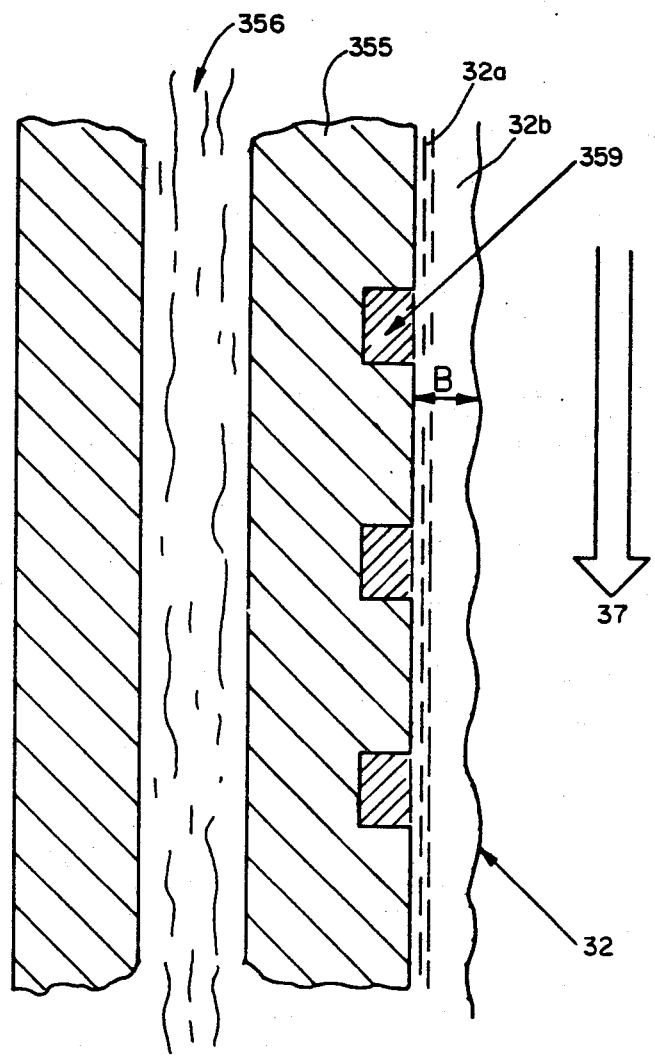

FIG. 9 shows an alternative swirlvane assemby which allows separate injection of the first gas-solid suspension 14e* which contains Class I and II batch ingredients, the Class III batch ingredients 20e*, the oxidant 22e* and the fuel 21e.

The nature of the vortex produced by an axial swirl cyclone reactor is significantly different from that produced by tangentially driven cyclone reactors in that strong secondary recirculation zones are located near the swirlvane assembly. The vortex flow field 30d (FIG. 8) and 30e (FIG. 9) is more three dimensional in nature than the vortex produced by a tangentially drive cyclone, and particle separation tends to be more localized at the head or top end of the vortex reactor. Thus, the primary vortex separation and reaction section of the axial swirl cyclone 350d and the rapid homogenization and refining section of the reactor 400d tend to be more discretely defined than in tangentially driven cyclone reactors.

Another advantage of the axial swirl cyclone reactor design over the tangential cyclone reactor configuration is the circumferential uniformity of the vortex flow field which is produced. This flow field tends to provide a uniform circumferential distribution of batch ingredients along the cyclone reactor side walls, thus enhancing the homogeniety of the glass which is formed. A disadvantage of the axial swirl cyclone reactor is the reduced separation efficiency (for a fixed pressure drop) relative to the tangentially fired cyclone. In addition, the construction materials and potential plugging problems can reduce the operating temperature range of this type vortex reactor in comparison to toroidal reactors and tangentially driven cyclone reactors.

As with the other vertical cyclone reactors, the symmetrical gravity force tends to produce a circumferentially uniform glass layer 32d along the side walls of the reactor. The reservoir 500d where final homogenization and refining occur is located at the bottom of the reactor. The hot glass 51d exits the reservoir 500d through a throat 501d, and preferably structure is provided for delivering the hot product glass 52d to forehearths or other glass making apparatus. The flue gas exhaust duct 600d is preferably located above the reservoir 500d along the reactor sidewall. The flue gas 62d is preferably delivered to a waste heat recovery system (not shown).

A horizontal axial swirl cyclone reactor (not shown) can also be adapted to the vortex melting process. A suspension preheater similar to preheater 100a shown in FIG. 2 and injector designs 200d or 200e as shown in FIGS. 8 and injector design and gas-solids flow patterns 30d and 30e in the vortex region will be similar to that shown in FIG. 8 and 9. However, the horizontal orientation results in the formation of a puddle of molten glass on the bottom of the vortex reactor similar to that shown in FIG. 5, and similar reactor design changes as shown in FIG. 5 are necessary for re-orientation of the exit duct similar 600a and the distributor/reservoir 500 as was described for the horizontal, tangentially driven cyclone.

Hybrid combinations of axial swirl and tangentially driven cyclone reactors in conjunction with variations in flow patterns such as downflow, reverse flow and tangential exit reactors can also be adapted to the vortex melting process. These variations will not depart from the basic process steps identified in this invention.

What is claimed is:

1. A method of melting glass in a vortex reactor comprising the steps of:
    heating first glass batch material;
    mixing said heated first glass batch material with second glass batch material, whereby a glass material mixture is created;
    introducing said mixture into said vortex reactor;
    introducing fuel and oxidant into said vortex reactor concurrent with the introduction of said mixture;
    said introductions of mixture and fuel and oxidant being done in such a manner as to produce a vortex flow in said reactor and to disperse said glass batch materials to the walls of said reactor; and
    combusting said fuel within said reactor in the presence of said glass batch material mixture, whereby the interior of said reactor and the mixture therein are heated and whereby said glass batch materials comprising said mixture collide with each other and the walls of said reactor thereby forming molten glass layer on said reactor walls.

2. A method as claimed in claim 1, wherein in said heating of said first glass batch material comprise heating said first glass batch material in a suspension heater.

3. A method as claimed in claim 2 further comprising injecting fuel and oxidant into said suspension heater.

4. A method as claimed in claim 1, wherein:
    said mixing of said first and second glass batch materials occurs in at least one injector assembly means; and
    said introducing of said mixture into said reactor comprises injecting said mixture from said injector assembly means into said reactor.

5. A method as claimed in claim 4 wherein said fuel and oxidant are combined with said mixture in said injector assembly means and are injected into said reactor along with said mixture.

6. A method as claimed in claim 1 wherein heating of said first glass batch material comprises entraining said first material in a preheated oxidant.

7. A method as claimed in claim 1 wherein heating of said first glass batch material comprises combusting a fuel and oxidant in a suspension heater and mixing in said heater the first material with the combustion products of said fuel and oxidant.

8. A method as claimed in claim 1 wherein said reactor is a toroidal vortex reactor.

9. A method of claimed in claim 8 wherein:
    said mixing of said first and second glass batch materials occurs in a plurality of injector assembly means circumferentially spaced around said reactor;
    said fuel and oxidant are combined with said mixture in said injector assembly means; and
    said mixture and said fuel and oxidant are injected together into said vortex reactor toward a common location within said reactor.

10. A method as claimed in claim 1 wherein said vortex reactor is a tangentially fired cyclone vortex reactor and said mixture and said fuel and oxidant are introduced together into said reactor at at least one location tangential to the circumference of said reactor.

11. A method as claimed in claim 10 wherein said reactor is a vertical downflow cyclone reactor.

12. A method as claimed in claim 10 wherein said reactor is a vertical reverse flow cyclone reactor.

13. A method as claimed in claim 10 wherein said reactor is a horizontal cyclone reactor.

14. A method as claimed in claim 1 wherein said reactor is a vertical downflow axial swirl cyclone-type vortex reactor.

15. A method as claimed in claim 14 wherein said mixture and said fuel and oxidant are introduced into said reactor through a swirlvane injector assembly means.

16. A method as claimed in claim 1 wherein:
    said first glass batch material is comprised of at least one glassmaking material selected from the group of glass forming materials. comprising:
    (a) materials which offgas upon heating and the remaining oxides of which have relatively low vapor pressures at glass melting temperatures; and
    (b) materials which do not decompose readily upon heating and the oxides of which have relatively low vapor pressures at glassmaking temperatures; and
    said second glass batch material is comprised of materials which decompose readily upon heating and the remaining oxides of which have relatively high vapor pressures at glass melting temperatures.

17. A method as claimed in claim 1 further comprising controlling refining and homogenization of the glass layer formed within said reactor.

18. A method as claimed in claim 1, wherein said reactor is a tangentially fired cyclone vortex reactor.

19. A method as claimed in claim 1, wherein said vortex reactor is a vertical downflow axial swirl cyclone-type reactor.

20. A method as claimed in claim 19 wherein said glass batch material mixture and said fuel and oxidant are introduced into said reactor through a swirlvane injector assembly means.

* * * * *